United States Patent
Wagner et al.

(10) Patent No.: US 11,847,652 B2
(45) Date of Patent: *Dec. 19, 2023

(54) WIRELESS BIOMETRIC AUTHENTICATION SYSTEM AND METHOD

(71) Applicant: Visa International Service Association, San Francisco, CA (US)

(72) Inventors: Kim R. Wagner, Sunnyvale, CA (US); John F. Sheets, San Francisco, CA (US); Mark Allen Nelsen, Oakland, CA (US)

(73) Assignee: Visa International Service Association, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/683,660

(22) Filed: Mar. 1, 2022

(65) Prior Publication Data

US 2022/0191014 A1 Jun. 16, 2022

Related U.S. Application Data

(63) Continuation of application No. 16/063,686, filed as application No. PCT/US2016/058880 on Oct. 26, 2016, now Pat. No. 11,303,435.

(Continued)

(51) Int. Cl.
*G06Q 20/40* (2012.01)
*G06Q 20/32* (2012.01)
(Continued)

(52) U.S. Cl.
CPC ....... *G06Q 20/40145* (2013.01); *G06F 18/22* (2023.01); *G06F 21/32* (2013.01);
(Continued)

(58) Field of Classification Search
CPC ......... G06Q 20/40145; G06Q 20/3224; G06Q 20/3226; G06Q 20/3823; G06Q 20/3829;
(Continued)

(56) References Cited

U.S. PATENT DOCUMENTS 8,401,244 B2 3/2013 Vogler et al.
8,468,095 B1 6/2013 DiMartino et al.
(Continued)

FOREIGN PATENT DOCUMENTS

CN 101282217 A 10/2008
CN 101965710 A 2/2011
(Continued)

OTHER PUBLICATIONS

Berkvoits, How to Broadcast a Secret (Year: 1991).*
(Continued)

*Primary Examiner* — John W Hayes
*Assistant Examiner* — Edgar R. Martinez-Hernandez
(74) *Attorney, Agent, or Firm* — Kilpatrick Townsend & Stockton LLP

(57) ABSTRACT

Embodiments of the invention involve using biometric templates to wirelessly authenticate individuals. In one embodiment, a mobile device may generate a first biometric template and a first public value from a first biometric sample of a user and generate a first cryptographic key by passing the first biometric template to a fuzzy extractors generate function. An access device may generate a second biometric template from a second biometric sample of the user, generate a second secret cryptographic key by passing the second biometric template and the first public value to the fuzzy extractors reproduce function, encrypt the second biometric template with the second secret cryptographic key, and broadcast the encrypted template to a plurality of nearby mobile devices including the mobile device. If the mobile (Continued)

device is able to decrypt the encrypted template with the first cryptographic key, the access device can associate the user with the mobile device.

20 Claims, 10 Drawing Sheets

Related U.S. Application Data

(60) Provisional application No. 62/246,476, filed on Oct. 26, 2015.

(51) Int. Cl.
| | |
|---|---|
| *G06Q 20/38* | (2012.01) |
| *H04L 9/08* | (2006.01) |
| *H04L 9/32* | (2006.01) |
| *H04W 12/06* | (2021.01) |
| *G06N 7/02* | (2006.01) |
| *G06Q 20/18* | (2012.01) |
| *G06Q 50/26* | (2012.01) |
| *G06F 21/32* | (2013.01) |
| *G06V 10/75* | (2022.01) |
| *G06V 40/50* | (2022.01) |
| *G06F 18/22* | (2023.01) |
| *G06F 21/45* | (2013.01) |
| *G06Q 20/36* | (2012.01) |
| *G06V 40/10* | (2022.01) |
| *G06V 40/12* | (2022.01) |
| *G06V 40/16* | (2022.01) |
| *G06V 40/18* | (2022.01) |

(52) U.S. Cl.
CPC ............... *G06F 21/45* (2013.01); *G06N 7/02* (2013.01); *G06Q 20/3224* (2013.01); *G06Q 20/3226* (2013.01); *G06Q 20/383* (2013.01); *G06Q 20/3823* (2013.01); *G06Q 20/3829* (2013.01); *G06Q 20/40155* (2020.05); *G06V 10/75* (2022.01); *G06V 40/50* (2022.01); *H04L 9/0841* (2013.01); *H04L 9/0866* (2013.01); *H04L 9/3231* (2013.01); *H04W 12/06* (2013.01); *G06Q 20/18* (2013.01); *G06Q 20/327* (2013.01); *G06Q 20/3674* (2013.01); *G06Q 20/40975* (2013.01); *G06Q 50/265* (2013.01); *G06Q 2220/00* (2013.01); *G06V 40/10* (2022.01); *G06V 40/1365* (2022.01); *G06V 40/172* (2022.01); *G06V 40/197* (2022.01); *G06V 40/53* (2022.01)

(58) Field of Classification Search
CPC ........... G06Q 20/383; G06Q 20/40155; G06Q 20/18; G06Q 20/327; G06Q 20/3674; G06Q 20/40975; G06Q 50/265; G06Q 2220/00; G06F 18/22; G06F 21/32; G06F 21/45; G06N 7/02; G06V 10/75; G06V 40/50; G06V 40/10; G06V 40/1365; G06V 40/172; G06V 40/197; G06V 40/53; H04L 9/0841; H04L 9/0866; H04L 9/3231; H04W 12/06
See application file for complete search history.

(56) References Cited

U.S. PATENT DOCUMENTS

| | | | | |
|---|---|---|---|---|
| 8,577,803 | B2* | 11/2013 | Chatterjee | G06Q 20/326 705/41 |
| 9,135,612 | B1* | 9/2015 | Proctor, Jr. | G06Q 30/06 |
| 9,633,383 | B2 | 4/2017 | Zamer | |
| 11,303,435 | B2 | 4/2022 | Wagner et al. | |
| 11,341,498 | B2* | 5/2022 | Ji | G06Q 20/40 |
| 2002/0124176 | A1 | 9/2002 | Epstein | |
| 2004/0020984 | A1 | 2/2004 | Clark | |
| 2005/0031126 | A1* | 2/2005 | Edney | H04L 63/068 380/278 |
| 2007/0033414 | A1 | 2/2007 | Dunko | |
| 2010/0134246 | A1 | 6/2010 | Kevenaar et al. | |
| 2011/0264586 | A1* | 10/2011 | Boone | G06Q 20/20 705/16 |
| 2012/0072353 | A1* | 3/2012 | Boone | H04L 63/083 705/16 |
| 2013/0036309 | A1 | 2/2013 | Kevenaar et al. | |
| 2014/0349692 | A1* | 11/2014 | Zhou | H04M 1/72439 455/466 |
| 2015/0036894 | A1* | 2/2015 | Matsunami | G06V 40/10 382/115 |
| 2015/0095654 | A1 | 4/2015 | Li et al. | |
| 2015/0100485 | A1 | 4/2015 | Skliar | |
| 2015/0154440 | A1 | 6/2015 | Rosenkrantz | |
| 2015/0172560 | A1 | 6/2015 | Baek | |
| 2015/0221149 | A1 | 8/2015 | Main et al. | |
| 2016/0036810 | A1 | 2/2016 | Kim et al. | |

FOREIGN PATENT DOCUMENTS

| | | |
|---|---|---|
| CN | 101976321 A | 2/2011 |
| CN | 101977197 A | 2/2011 |
| CN | 102710613 A | 10/2012 |
| CN | 103679907 A | 3/2014 |
| CN | 204406426 U | 6/2015 |
| WO | 2008069475 A1 | 6/2008 |
| WO | 2010011932 A1 | 1/2010 |
| WO | 2015153559 A1 | 10/2015 |
| WO | 2017075063 A1 | 5/2017 |

OTHER PUBLICATIONS

Bervoits, How to Broadcast a Secret (Year: 1991).*
Dodis, Fuzzy Extractors How to Generate Strong Keys (Year: 2008).*
What is an SSID (Service Set Identifier)__Definition from Tech Target (Year: 2023).*
Resource Provider API (Year: 2023).*
U.S. Appl. No. 16/063,686, "Advisory Action", dated Oct. 26, 2021, 6 pages.
U.S. Appl. No. 16/063,686, "Final Office Action", dated Jul. 28, 2021, 21 pages.
U.S. Appl. No. 16/063,686, "Non-Final Office Action", dated Dec. 18, 2020, 20 pages.
U.S. Appl. No. 16/063,686, "Notice of Allowance", dated Dec. 3, 2021, 9 pages.
Aprit et al., "An Analysis of Random Projections in Cancelable Biometrics", Proceedings of the 31st International Conference on Machine Learning, vol. 32, Nov. 14, 2014, 9 pages.
Berkvoits, "How to Broadcast a Secret", University of Lowell and The MITRE Corporation, 1991, 7 pages.
Bissessar, "Cryptographic Credentials with Privacy-Preserving Biometric Bindings", Master of Computer Science, 2013, 116 pages.
Buhan et al., "Secure Ad-hoc Pairing with Biometrics: SAfE", Available Online at: https://research.utwente.nl/files/5103440/SAfE-final.pdf, Jan. 1, 2007, pp. 1-7.
CN201680062390.2, "Notice of Decision to Grant", dated Jan. 29, 2022, 6 pages.
CN201680062390.2, "Office Action", dated Jun. 17, 2021, 27 pages.
Dodis et al., "Fuzzy Extractors How To Generate Strong Keys", Jan. 20, 2008, 47 pages.
EP16860694.5, "Extended European Search Report", dated Sep. 17, 2018, 9 pages.
EP16860694.5, "Notice of Decision to Grant", dated Feb. 27, 2020, 2 pages.

(56) References Cited

OTHER PUBLICATIONS

EP20165408.4, "Extended European Search Report", dated Jul. 13, 2020, 8 pages.
EP20165408.4, "Notice of Decision to Grant", dated Nov. 18, 2021, 2 pages.
Gong, "New Protocols for Third-Party-Based Authentication and Secure Broadcast", SRI International Computer Science Laboratory, Nov. 2, 1994, pp. 176-183.
Marino et al., "A Crypto-Biometric Scheme Based on Iris-Templates with Fuzzy Extractors", Information Sciences, Jul. 15, 2012, pp. 1-20.
Mendez, "Hand Book of Applied Cryptography", 1965.
PCT/US2016/058880, "International Preliminary Report on Patentability", dated May 11, 2018, 5 pages.
PCT/US2016/058880, "International Search Report and Written Opinion", dated Jan. 26, 2017, 12 pages.
Rathgeb et al., "A Survey on Biometric Cryptosystems and Cancelable Biometrics", Eurasip Journal on Information Security, vol. 2011, No. 1, Jan. 1, 2011, 25 pages.
SG10202012932X, "Written Opinion", dated Jul. 9, 2021, 10 pages.
SG11201801684W, "Notice of Decision to Grant", dated Oct. 26, 2020, 6 pages.
SG11201801684W, "Written Opinion", dated Mar. 28, 2020, 7 pages.
SG10202012932X, "Notice of Decision to Grant", dated Apr. 18, 2022, 6 pages.

\* cited by examiner

WIRELESS BIOMETRIC AUTHENTICATION SYSTEM AND METHOD

CROSS-REFERENCES TO RELATED APPLICATIONS

This application is a continuation of U.S. application Ser. No. 16/063,686, filed Jun. 18, 2018, which is the National Stage of International Application No. PCT/US2016/058880, filed Oct. 26, 2016, which claims priority to U.S. Provisional Application No. 62/246,476, filed on Oct. 26, 2015, the entire contents of which are hereby incorporated by reference for all purposes.

BACKGROUND

The use of biometrics as means for authenticating individuals may provide various advantages. In a system that controls access to a resource via biometric means, an individual could present, for authenticating oneself to an access device of the system, biometric data that is derived from one or more physical characteristics innate to the individual (e.g., a photo of the face, a retinal scan, a fingerprint, a voice print, etc.). Thus, an individual would not need to remember passwords, provide answers to security questions, or keep a physical security token.

However, existing biometrics-based authentication systems are not without problems. For instance, such systems can be slow or cumbersome to use. In one particular system, to facilitate future authentications at a resource provider (e.g., a trade show organizer), an individual (e.g., a participant in the trade show) may register one's smartphone with the resource provider and provide a photo of the individual's face to the resource provider. When the individual later makes a request for access to a resource (e.g., entry into the trade show), the access device would detect the individual's smartphone and retrieve a set of photos that includes the individual's photo. However, the access device would still need human input (e.g., the input of a security guard) to match the smartphone to the individual's photo before it can grant access to the individual.

Additionally, biometric data may be vulnerable to theft and abuse by various bad actors. For example, while the vast majority of access devices may be trustworthy, it is possible to encounter an access device that has been hacked or otherwise compromised. Accordingly, the rogue access device could steal an individual's biometric data when the individual makes a request to access a resource. Furthermore, for authentication systems that involve the wireless transmission of biometric data, bystanders that happen to be near the transmission may be able to steal biometric data.

Embodiments of the present invention address these problems and other problems individually and collectively.

BRIEF SUMMARY

Embodiments of the invention are directed to using biometric templates to securely authenticate individuals over wireless communication technologies.

For example, a first mobile device may obtain a first biometric sample from a first user of the first mobile device and generate, from the first biometric sample, a first large biometric template and a first small biometric template. The first mobile device may then generate a first public value and a first cryptographic key by passing the first small biometric template to a generate function of a fuzzy extractor. At some point when the first user is at a location associated with a resource provider (i.e., a resource provider location), the first mobile device may detect an access device that is associated with the resource provider. In response, the first mobile device may transmit the first public value to the access device. Accordingly, if there are other users at the resource provider location, the access device may receive, from each of their mobile devices, a public value that was generated by the mobile device based on a biometric sample of the mobile device's user.

When it comes time for the first user to be authenticated by the access device, the access device may obtain a second biometric sample and generate a second large biometric template and a second small biometric template from the second biometric sample. In situations where multiple mobile devices are within a proximate vicinity of the access device, the access device may attempt to determine which mobile device is the one associated with the first user (which would be the first mobile device).

Thus, the access device can detect a number of mobile devices that are within a proximate vicinity of the access device, where the plurality of devices includes the first mobile device. For each of the proximate mobile devices, the access device may perform the following steps: the access device may retrieve the public value that is associated with the mobile device; generate a secret cryptographic key by passing the second small biometric template and the public value to a reproduce function of the fuzzy extractor; encrypt the second large biometric template with the secret cryptographic key; and broadcast the encrypted second large biometric template to the plurality of mobile devices. Accordingly, each time the access device broadcasts the second large biometric template, the template may be encrypted with a different secret cryptographic key.

For each broadcast, each mobile device that receives the broadcast may attempt to decrypt the encrypted second large biometric template using the secret cryptographic key that was generated and stored on the mobile device. However, a mobile device will succeed in its decryption attempt only if the access device, prior to performing this particular broadcast, encrypted the second large biometric template using a secret cryptographic key that the access device generated using the public value that was received from the mobile device.

For example, when the first mobile device receives a broadcast of the encrypted second large biometric template, the first mobile device may attempt to decrypt the template using the first cryptographic key. However, the decryption attempt will succeed only if the encryption for this particular broadcast used the secret cryptographic key that was generated using the first public value. If the encryption used a secret cryptographic key that was generated using a different public value (that was generated from a biometric sample of a different user by a different mobile device), the decryption attempt will fail.

If the decryption attempt is successful, the first mobile device may determine whether the second large biometric template matches the first large biometric template stored on the first mobile device. If there is a match, the first mobile device may sends a confirmation of the match to the access device. Because the access device has determined that the first mobile device is associated with the first user, the access device may grant the first user access to a resource.

Other embodiments are directed to systems, portable consumer devices, and computer readable media associated with methods described herein.

A better understanding of the nature and advantages of embodiments of the present invention may be gained with reference to the following detailed description and the accompanying drawings.

DETAILED DESCRIPTION

Figure 1:
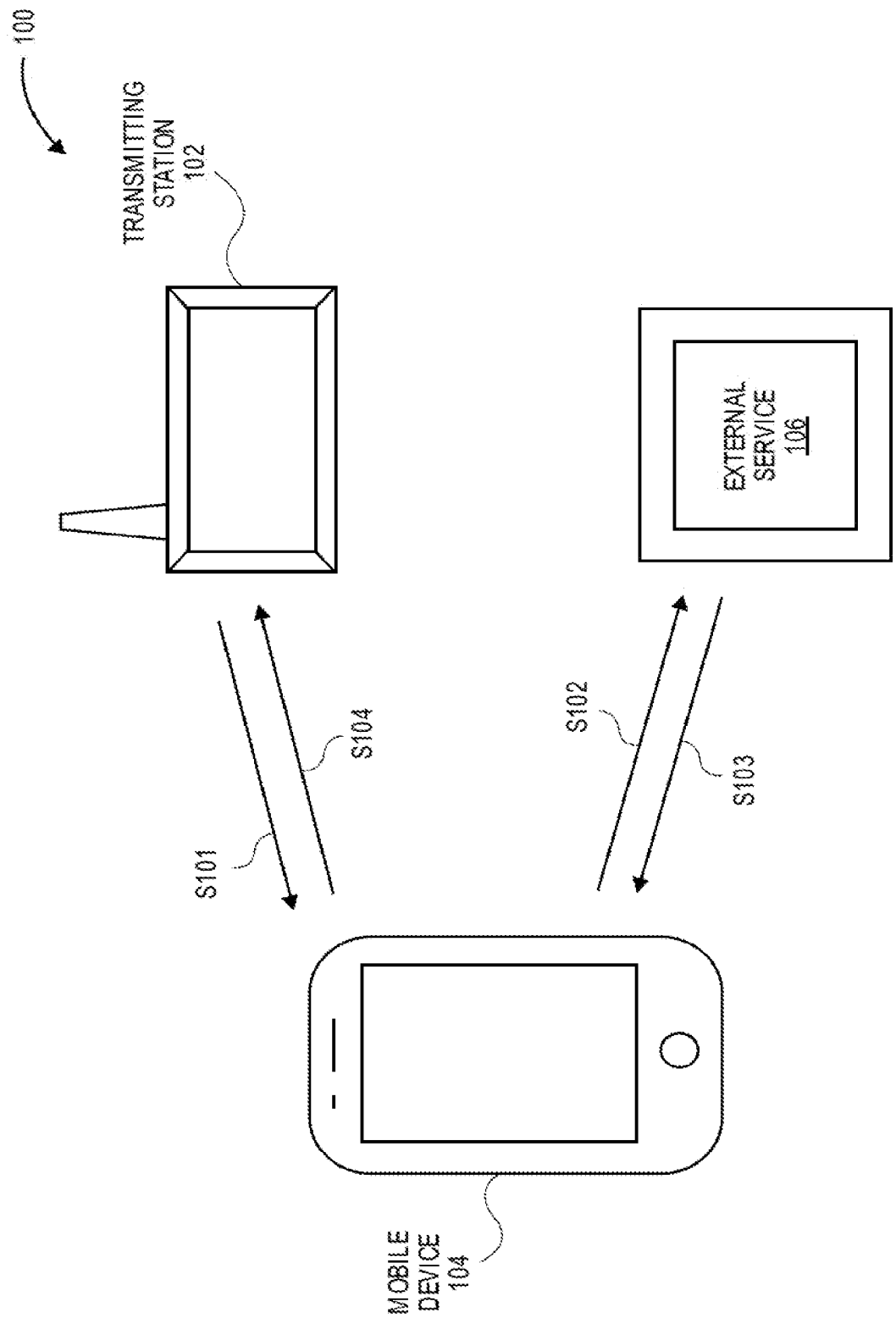
FIG. 1 depicts a system for detecting a mobile device at a resource provider location in accordance with some embodiments.

Embodiments of the invention are directed to using biometric templates to securely authenticate individuals over wireless communication technologies. Some embodiments can allow a user to authenticate oneself to an access device to obtain access to a resource, merely by capturing a biometric. The user does not need to take out his or her phone and verification of the user's biometric can be conducted in a way that reduces the risk of the user's biometric being compromised.

For example, a first mobile device (i.e., a portable communication device) may obtain a first biometric sample from a first user of the first mobile device (e.g., take a first photo of the first user's face) and generate, from the first biometric sample, a first large biometric template and a first small biometric template. The first mobile device may then generate a first public value and a first cryptographic key by passing the first small biometric template to a generate function of a fuzzy extractor. At some point when the first user is at a location associated with a resource provider (i.e., a resource provider location), the first mobile device may detect an access device that is associated with the resource provider (e.g., via a beacon broadcasted by or on behalf of the broadcast device). In response, the first mobile device may transmit the first public value to the access device. Accordingly, if there are other users at the resource provider location, the access device may receive, from each of their mobile devices, a public value that was generated by the mobile device based on a biometric sample of the mobile device's user.

When it comes time for the first user to be authenticated by the access device, the access device may obtain a second biometric sample (e.g., take a second photo of the first user's face) and generate a second large biometric template and a second small biometric template from the second biometric sample. In situations where multiple mobile devices are within a proximate vicinity of the access device, the access device may attempt to determine which mobile device is the one associated with the first user (which would be the first mobile device).

Thus, the access device can detect a number of mobile devices that are within a proximate vicinity of the access device, where the plurality of devices includes the first mobile device. For each of the proximate mobile devices, the access device may perform the following steps: the access device may retrieve the public value that is associated with the mobile device; generate a secret cryptographic key by passing the second small biometric template and the public value to a reproduce function of the fuzzy extractor; encrypt the second large biometric template with the secret cryptographic key; and broadcast the encrypted second large biometric template to the plurality of mobile devices. Accordingly, each time the access device broadcasts the second large biometric template, the template may be encrypted with a different secret cryptographic key.

The number of times the second large biometric template is broadcasted may be as high as the number of nearby mobile devices at the time of the authentication. For each broadcast, each mobile device that receives the broadcast may attempt to decrypt the encrypted second large biometric template using the secret cryptographic key that was generated and stored on the mobile device. However, a mobile device will succeed in its decryption attempt only if the access device, prior to performing this particular broadcast, encrypted the second large biometric template using a secret cryptographic key that the access device generated using the public value that was received from the mobile device.

For example, when the first mobile device receives a broadcast of the encrypted second large biometric template, the first mobile device may attempt to decrypt the template using the first cryptographic key. However, the decryption attempt will succeed only if the encryption for this particular broadcast used the secret cryptographic key that was generated using the first public value. If the encryption used a secret cryptographic key that was generated using a different public value (that was generated from a biometric sample of a different user by a different mobile device), the decryption attempt will fail (e.g., produce garbage).

If the decryption attempt is successful, the first mobile device may determine whether the second large biometric template matches the first large biometric template stored on the first mobile device (e.g., whether the first photo and the second photo display the face of the first user). If there is a match, the first mobile device may sends a confirmation of the match to the access device. Because the access device has determined that the first mobile device is associated with the first user, the access device may grant the first user access to a resource.

In some embodiments, a mobile device, upon entering the resource provider location, may detect a beacon containing a transmitting station identifier that is sent by a transmitting station to the mobile device. Upon receiving the transmitting station identifier, the mobile device may transmit the transmitting station identifier to an external service computer and, in response, receive a resource provider identifier that is associated with the resource provider. Upon receiving the resource provider identifier, the mobile device may transmit an identifier of the user of the mobile device (i.e., a user identifier), the public value that was generated on the mobile device, and the resource provider identifier to the transmitting station.

Some embodiments of the invention can be directed to a BLE (Bluetooth low energy) use case where a customer (i.e., a user) with a smartphone (i.e., a mobile device) shops in a bricks-and-mortar store (i.e., a resource provider location). Here, facial recognition (or recognition through the use of other biometrics) can help disambiguate customers at or near the cash register (i.e., an access device) without the customer having to perform any explicit actions.

Before discussing additional specific embodiments and examples, some descriptions of terms used herein are provided below.

As used herein, an "access device" may be any suitable device that can be used to access an external system. For example, an access device can be for communicating with a merchant computer or payment processing network, and for interacting with a payment device, a user computer apparatus, and/or a user mobile device. An access device may generally be located in any suitable location, such as at the location of a merchant. An access device may be in any suitable form. Some examples of access devices include POS devices, cellular phones, PDAs, personal computers (PCs), tablet PCs, hand-held specialized readers, set-top boxes, electronic cash registers (ECRs), automated teller machines (ATMs), virtual cash registers (VCRs), kiosks, security systems, access systems, Websites, and the like. An access device may use any suitable contact or contactless mode of operation to send or receive data from, or associated with, a payment device and/or a user mobile device. In some embodiments, where an access device may comprise a POS terminal, any suitable POS terminal may be used and may include a reader, a processor, and a computer-readable medium. A reader may include any suitable contact or contactless mode of operation. For example, exemplary card readers can include radio frequency (RF) antennas, optical scanners, bar code readers, or magnetic stripe readers to interact with a payment device and/or mobile device. The access device may also have a biometric reader capable of reading any of the biometric samples described herein or otherwise.

An "authorization request message" may be an electronic message that is sent to request authorization for an action. In some embodiments, an "authorization request message" may be a message that is sent to a payment processing network and/or an issuer of a payment card to request authorization for a transaction. An authorization request message according to some embodiments may comply with ISO 8583, which is a standard for systems that exchange electronic transaction information associated with a payment made by a consumer using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), an expiration date, etc. An authorization request message may also comprise "transaction information," such as any information associated with a current transaction, such as the transaction amount, merchant identifier, merchant location, etc., as well as any other information that may be utilized in determining whether to identify and/or authorize a transaction.

An "authorization response message" may be an electronic message reply to an authorization request message. It may be generated by an issuing financial institution or a payment processing network. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the payment processing network) to the merchant's access device (e.g. POS equipment) that indicates approval of the transaction. The code may serve as proof of authorization. As noted above, in some embodiments, a payment processing network may generate or forward the authorization response message to the merchant.

As used herein, an "electronic wallet" or "digital wallet" can store user profile information, payment information, bank account information, and/or the like and can be used in a variety of transactions, such as but not limited to eCommerce, social networks, money transfer/personal payments, mobile commerce, proximity payments, gaming, and/or the like for retail purchases, digital goods purchases, utility payments, purchasing games or gaming credits from gaming websites, transferring funds between users, and/or the like.

As used herein, a "mobile device" (sometimes referred to as a mobile communication device) may comprise any electronic device that may be transported and operated by a user, which may also provide remote communication capabilities to a network. Examples of remote communication capabilities include using a mobile phone (wireless) network, wireless data network (e.g. 3G, 4G or similar networks), Wi-Fi, Bluetooth, Bluetooth Low Energy (BLE), Wi-Max, or any other communication medium that may provide access to a network such as the Internet or a private network. Examples of mobile devices include mobile phones (e.g. cellular phones), PDAs, tablet computers, net books, laptop computers, wearable devices (e.g., watches), vehicles such as automobiles and motorcycles, personal music players, hand-held specialized readers, etc. A mobile device may comprise any suitable hardware and software for performing such functions, and may also include multiple devices or components (e.g. when a device has remote access to a network by tethering to another device—i.e. using the other device as a modem—both devices taken together may be considered a single mobile device). A mobile device may also comprise a verification token in the form of, for instance, a secured hardware or software component within the mobile device and/or one or more external components that may be coupled to the mobile device. A detailed description of a mobile device is provided below.

As used herein, a "payment account" (which may be associated with one or more payment devices) may refer to any suitable payment account including a credit card account, a checking account, or a prepaid account.

As used herein, a "payment device" may refer to any device that may be used to conduct a financial transaction, such as to provide payment information to a merchant. A payment device may be in any suitable form. For example, suitable payment devices can be hand-held and compact so that they can fit into a consumer's wallet and/or pocket (e.g., pocket-sized) and may be in the form of a mobile device as described above. They may include smart cards, magnetic stripe cards, keychain devices (such as the Speedpass™ commercially available from Exxon-Mobil Corp.), etc. Other examples of payment devices include cellular phones, personal digital assistants (PDAs), pagers, payment cards, security cards, access cards, smart media, transponders, 2-D barcodes, an electronic or digital wallet, and the like. Such devices can operate in either a contact or contactless mode.

As used herein, a "server computer" is typically a powerful computer or cluster of computers. For example, the server computer can be a large mainframe, a minicomputer cluster, or a group of servers functioning as a unit. In one example, the server computer may be a database server coupled to a Web server.

"Biometric data" includes data that can be used to uniquely identify an individual based upon one or more intrinsic physical or behavioral traits. For example, biometric data may include fingerprint data and retinal scan data. Further examples of biometric data include digital photographic data (e.g., facial recognition data), deoxyribonucleic acid (DNA) data, palm print data, hand geometry data, and iris recognition data.

A "biometric template" can be a digital reference of distinct characteristics that have been extracted from a biometric sample provided by a user. A biometric template may be derived from biometric data. Biometric templates are used during the biometric authentication process. Data from a biometric sample provided by a user at the time of authentication can be compared against the biometric template to determine whether the provided biometric sample closely matches the biometric template. In some embodiments, a "large biometric template" may refer to the biometric template that is initially derived from biometric data while a "small biometric template" may refer to a copy of the large biometric template that is either incomplete or at least partially obfuscated. In some embodiments, a "biometric template" may include a small biometric template, a large biometric template or the combination of the small and large biometric templates.

A "resource providing entity" can be any entity that provides resources during a transaction. For example, a resource providing entity can be a merchant, a venue operator, a building owner, a governmental entity, etc.

"User identifying information" can be any information associated with a user and that can identify the user. User identifying information can include, but is not limited to, a primary account number (PAN), telephone, e-mail address, zip code, mailing address, photo identification, personal identification number (PIN), etc.

I. Wireless Biometric Authentication System

Figure 2:
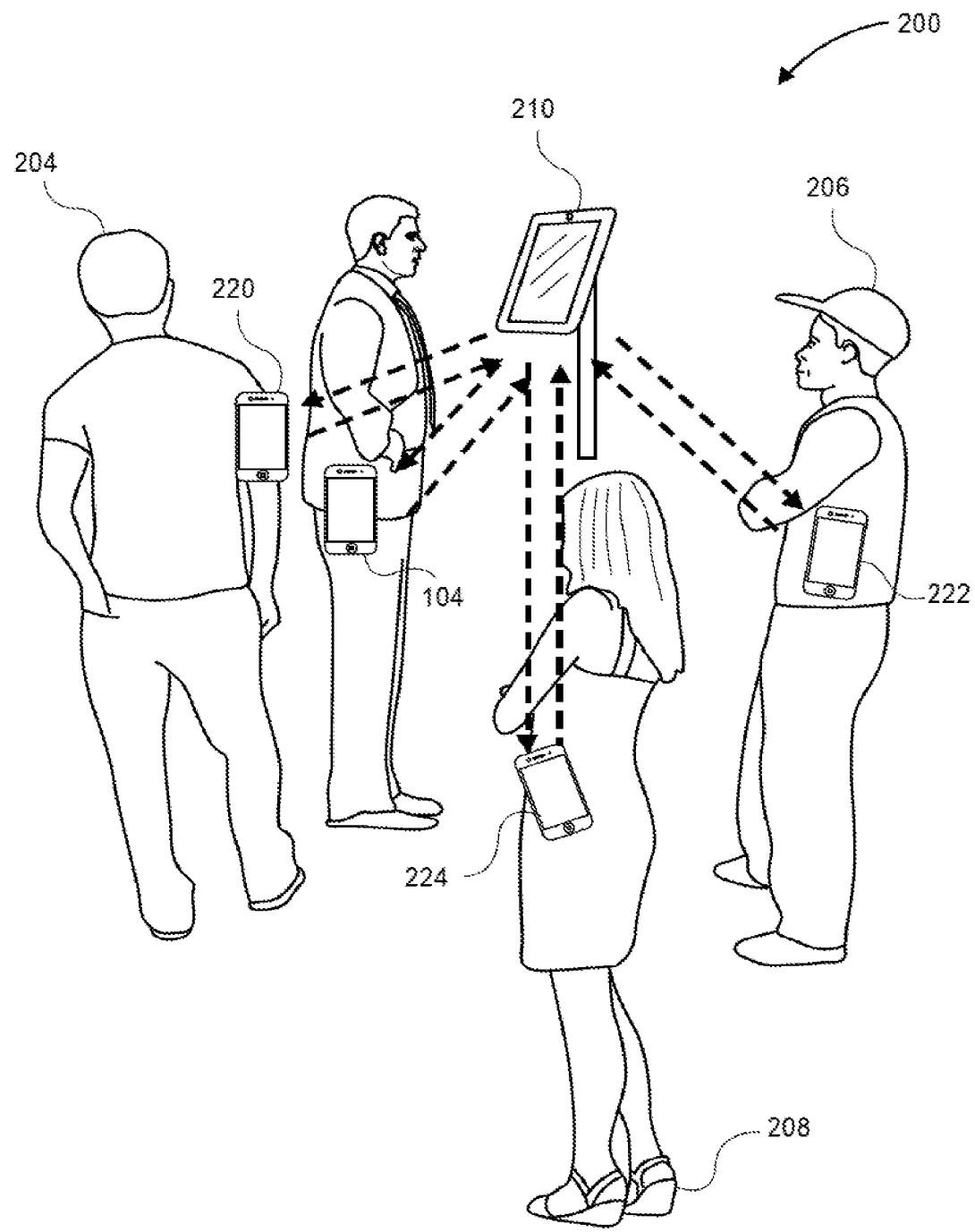
FIG. 2 depicts a system for controlling access to a resource using wireless biometric authentication in accordance with some embodiments.
Figure 3:
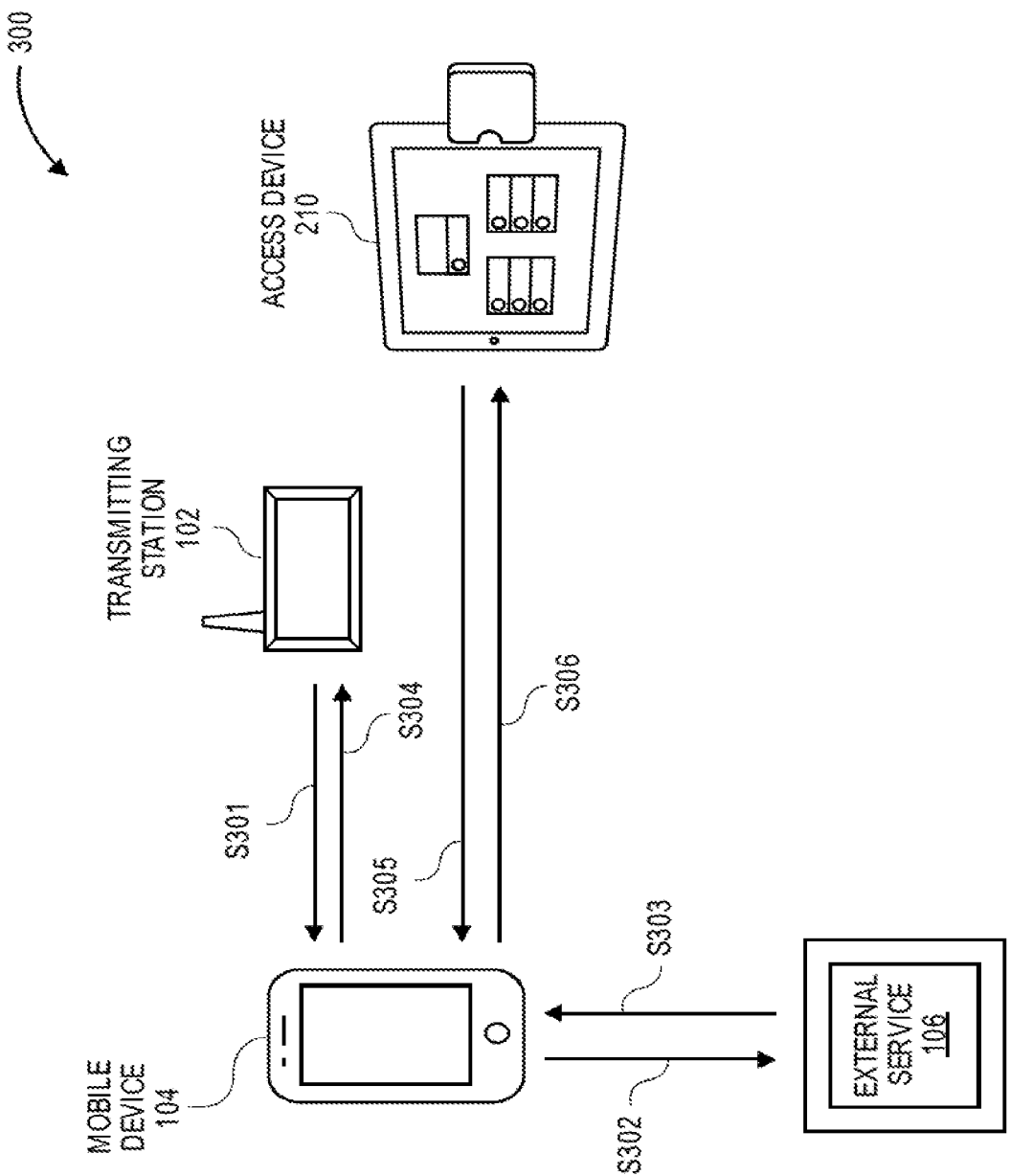
FIG. 3 depicts another exemplary system for controlling access to a resource using wireless biometric authentication in accordance with some embodiments.

FIGS. 1, 2, and 3 show diagrams illustrating various aspects of one or more systems for conducting wireless biometric authentication. In particular, each of the systems may be located at a resource provider location and may include one or more users that are at the resource provider location to conduct a transaction with the resource provider, where each of the users may possess a mobile device.

Transmitting Station

FIG. 1 depicts a system 100 for detecting a mobile device at a resource provider location. System 100 includes transmitting station 102, mobile device 104, and external service 106. The steps depicted in FIG. 1 describe how a mobile device interacts with a transmitting station of a resource provider location prior to interacting with an access device (e.g., prior to checkout).

Mobile device 104 may be a mobile device that is carried by a user while the user is located a resource provider location. For example, the user may be a customer with a smartphone (i.e., the mobile device) that is shopping in a bricks-and-mortar store (i.e., the resource provider location).

Transmitting station 102 may be a stationary device that is associated with the resource provider location. Transmitting station 102 may detect and communicate with mobile devices as they are carried to the resource provider location by their respective users. The communication may be carried out using a short-to-medium range wireless communication mechanism. For example, transmitting station 102 may be a Bluetooth Low Energy (BLE) beacon that detects the presence of the customer's smartphone via BLE as the customer enters the store and sends a beacon comprising a transmitting station identifier (i.e., a Beacon ID) to the smartphone.

Although this example describes a BLE communication mechanism, it is understood that embodiments of the invention may utilize any suitable wireless communication mechanism. Examples of such communication mechanisms may include the use of an suitable electrical, electromagnetic, or even acoustic mode of communication. For example, embodiments of the invention may use RF, IR, or even audio signals to transmit data to and from two devices in a wireless manner. Preferred communication mechanisms include short-to-medium range wireless communication mechanisms. Examples of communication mechanisms may include Wi-Fi, BLE, classic Bluetooth, etc.

In some embodiments, BLE technology is used as the short range communication protocol or technology. Bluetooth Low Energy is a wireless personal area network technology used for transmitting data over short distances. It is designed for low energy consumption and cost, while maintaining a communication range similar to classic Bluetooth. BLE communication consists primarily of "advertisements," or small packets of data, broadcast at a regular interval by beacons (which may be present in or be a base station) or other BLE enabled devices via radio waves.

External service 106, which can be implemented as a cloud based system or as a server computer system, can be remotely located with respect to the resource provider location. Mobile device 104 may use external service 106 as a trusted service (which may be merchant or payment processor drive) to translate a transmitting station identifier to an identification of the resource provider location (i.e., a resource provider location identifier). Communications between mobile device 104 and external service 106 can be performed using any suitable communications networks. Suitable communications networks may be any one and/or the combination of the following: a direct interconnection; the Internet; a Local Area Network (LAN); a Metropolitan Area Network (MAN); an Operating Missions as Nodes on the Internet (OMNI); mesh networks, a secured custom connection; a Wide Area Network (WAN); a wireless network (e.g., employing protocols such as, but not limited to a Wireless Application Protocol (WAP), I-mode, and/or the like); and/or the like. Communications may be performed using a secure communication protocol such as transport layer security protocol, secure sockets layer protocol, or other suitable secure communication protocols.

As shown in FIG. 1, mobile device 104 may be carried by the user as the user enters the resource provider location. At this point, the mobile device may possess a biometric template that was generated from a biometric sample of the user. For example, mobile device 104 may have installed on it, a smartphone application that walks the user through a process of generating the biometric template, where the mobile device takes a photo of the user's face and generates a biometric template based on the photo. The biometric template may then be stored in the mobile device.

Although this example describes the use of facial images as biometric samples, other biometric samples that may be used may include voice samples, fingerprint samples, DNA samples, hair samples, retinal scan samples, etc.

At step S101, transmitting station 102 detects mobile device 104 as it is carried into the resource provider location. For example, a customer's smartphone may be detected as the customer enters the store. Upon sensing mobile device 104, transmitting station 102 may send a beacon to the mobile device, where the beacon comprises a transmitting station identifier (e.g., a Beacon ID) that uniquely identifies the transmitting station. The transmitting station identifier may be extracted from the beacon by an application installed on mobile device 104.

In the same step, mobile device 104 and transmitting station 102 may exchange address information (e.g., IP addresses, MAC addresses) so that the transmitting station 102 and the mobile device 104 may recognize each other for subsequent communications.

At step S102, mobile device 104 communicates with external service 106 to identify the resource provider based on the received transmitting station identifier. In particular, the application installed on mobile device 104 may transmit the transmitting station identifier to external service 106. If geolocation information is available (e.g., mobile device 104 has geolocation switched on and the user has consented to the geolocation information being shared), the application may transmit the geolocation information to external service 106, which would enable the external service to catch attempts to spoof transmitting station identifiers.

At step S103, external service 106 responds to mobile device 104 with the appropriate resource provider location identifier. Upon receiving the transmitting station identifier, external service 106 may resolve the transmitting station identifier to a resource provider location identifier. In some cases, this may involve resolving the transmitting station identifier to a merchant identifier and a store identifier. In some embodiments, the merchant identifier and the store identifier may be referred to as a "Card Acceptor ID" (CAD) and a "Card Acceptor Name" (CAN) respectively. Any such identifiers may be used so long as they uniquely identify the resource provider location. Once the resource provider location identifier is determined, the identifier is transmitted back to mobile device 104.

At step S104, mobile device 104 transmits a message that comprises several pieces of information to transmitting station 102. The information may include an ephemeral mobile device identifier Dev_ID that identifies mobile device 104 while it is at the resource provider location. In some cases, the mobile device ID may be a large random number (e.g., 8 bytes) that is generated every time the mobile device is carried to the resource provider location. In particular, each mobile device that enters the resource provider location may provide a mobile device ID that uniquely identifies the mobile device for the duration of the visit. The resource provider may use these mobile device IDs to identify each mobile device and maintain consistent communication with each of the mobile devices without mixing them up from one interaction to the next while the mobile devices are at the resource provider location.

The information may include the resource provider location identifier (e.g., CAID and CAN). The information may include a customer identifier Cust_ID that the user wishes to be known as in the store at this time. The User_ID may be permanent or only for the current visit to the resource provider location. The information may include a nonce n, which is a random number of a certain size (e.g., 128 bits) that is generated by mobile device 104.

In embodiments where the public-key encryption is used to securely transfer biometric templates, the information may include a public key certificate PKCert that is associated with mobile device 104, where the certificate is signed by a certificate authority (CA). In such embodiments, the resource provider (i.e., the access device) would possess (or have access to) the CA's public key so that the resource provider would be able to verify the public key certificate of mobile device 104. The message may be signed using the private key of mobile device 104. Accordingly, in such embodiments, an example message sent by mobile device 104 to transmitting station 102 may comprise the following:

$$\text{Sign}_{PV}\{\text{Dev\_ID},\text{Cust\_ID},n,\text{CAID},\text{CAN}\},\text{PKCert}$$

As can be seen in the formula above, the example message comprises the public key certificate PKCert, the customer identifier Cust_ID, the device identifier Dev_ID, the resource provider location identifier CAID and CAN, the random number n, and a signature of the Dev_ID, the Cust_ID, n, CAID, and CAN. Using public-key encryption to securely transfer biometric templates is discussed in more detail below in reference to FIG. 4.

In embodiments where fuzzy extractor-based encryption is used to securely transfer biometric templates, the information may include a public value that is generated from a biometric template that is stored on the phone. Using fuzzy extractor-based encryption to securely transfer biometric templates is discussed in more detail below in reference to FIGS. 5-9.

After step S104, mobile device 104 may store status information containing the resource provider location identifier and geo-location information that tells the mobile device which resource provider location is being visited. Accordingly, the application installed on mobile device 104 may be designed such that only transactions involving the resource provider location identifier can be serviced.

Upon receiving the message from mobile device 104, transmitting station 102 may cause the creation of a status entry that contains information about the mobile device's presence at the resource provider location. Accordingly, the resource provider may maintain a status entry for each mobile device (e.g., at a database) that is carried to the resource provider location. For example, each status entry may comprise the parameters Dev_ID, Cust_ID, n, and PKCert associated with a particular mobile device at the resource provider location.

When mobile device 104 nears an access device to perform a transaction, the status entry associated with the mobile device may provide information that is used to complete the transaction.

B. Access Device

FIG. 2 depicts a system 200 for conducting a transaction using wireless biometric authentication in accordance with some embodiments. In particular, FIG. 2 shows users 202, 204, 206, and 208 standing in a line to perform a transaction with access device 210. Users 202, 204, 206 and 208 carry mobile devices 104, 220, 222, and 224 respectively. Thus, all of the mobile devices shown in FIG. 2 are within a proximate vicinity of access device 210. It should be noted that, although FIG. 2 depicts only mobile devices 104, 220, 222, and 224, there may be additional mobile devices that are considered to be at the resource provider location but not within a proximate vicinity of access device 210.

As shown in FIG. 2, when user 202 is ready to perform a transaction with access device 210, user 202 may stand in front of the access device while mobile device 104 remains in his pocket. Access device 210 captures an image of the face of user 202 and generates a biometric template based on the image. At this point, access device 210 may know that it is supposed to conduct a transaction with a mobile device owned by user 202. However, access device 210 may not necessarily know which of mobile devices 104, 220, 222, and 224 is the mobile device carried by user 202. Accordingly, access device 210 may use the biometric template to identify the correct mobile device to complete the transaction with.

In particular, access device 210 may broadcast its biometric template to all nearby mobile devices in an attempt to determine which mobile device possesses a biometric template that matches the access device's biometric template. It should be noted that, in some embodiments, a first biometric template does not have to be identical to a second biometric template in order to "match" the template. So long as the first biometric template is close enough to the second biometric template (e.g., the first biometric template possesses a similar number of features and/or possesses features that are similar enough to that of the second biometric template), the first biometric template can be considered to match the second biometric template for the purposes of those embodiments. In some embodiments, a "match" can be defined by a threshold matching score. For example, the first biometric template may correspond to a facial photo of user 202 taken by mobile device 104 while the second biometric template may correspond to a facial photo of user 202 taken by access device 210, where the similarities between the face shown in the first photo and the face shown in the second photo can be used to determine a match between the first and second biometric templates.

When a mobile device determines a match between its stored biometric template and a biometric template received in a broadcast, the mobile device may transmit a confirmation of a match back to access device 210. Upon receiving the confirmation, access device 210 may conduct the transaction with the mobile device that sent the confirmation. Hence, through the use of biometric authentication, the user of the first mobile device is able to perform a secure wireless transaction without having to manually manipulate the first mobile device or a portable transaction device (e.g., a credit card).

It should be noted, however, that the biometric template cannot be broadcasted in the clear because doing so could jeopardize transactional security and give rise to privacy concerns. After all, it can be assumed that users would not want their facial images or other biometric information broadcasted openly. Thus, embodiments of the invention may encrypt the biometric template prior to broadcasting it. Two main techniques for encrypting biometric templates may include a first technique that uses public-key encryption, which is described below in reference to FIG. 4, and a second technique that uses the concept of fuzzy extractors, which is described below in reference to FIGS. 5-9.

FIG. 3 depicts another exemplary system 300 for conducting a transaction using wireless biometric authentication in accordance with some embodiments. In particular, FIG. 3 shows transmitting station 102, mobile device 104, external service 106, and access device 210.

Access device 210 and transmitting station 102 can be uncoupled or coupled together. In some embodiments, access device 210 and transmitting station 102 can be embodied by the same device. In other embodiments, access device 210 and transmitting station 102 can be embodied by different devices that communicate with each other over a network (e.g., a local area network).

In FIG. 3, steps S301, S302, S303, and S304 may correspond to steps S101, S102, S103, and S104 in FIG. 1, respectively. The descriptions of those steps are incorporated herein and need not be repeated.

When the user is ready to check out and stands in front of the access device 210, the access device 210 may capture a picture of the user's face, and generate a biometric template from that image. It is noted that other types of biometric samples may be captured in other embodiments of the invention. The access device 210 may also encrypt the image of the user's face.

At step S305, access device 210 may broadcast its encrypted biometric template to all nearby mobile devices, including mobile device 104. Upon receiving the broadcast, mobile device 104 may attempt to decrypt the encrypted biometric template. If the encryption attempt succeeds, mobile device 104 may determine whether its stored biometric template matches the received biometric template.

At step S306, upon determining that the biometric templates match, access device 210 transmits a confirmation of the match back to access device 210. Upon receiving the confirmation, access device 210 may conduct the transaction with mobile device 104 on behalf of user 202. After the transaction is finished, user 202 may leave while user 204, who is next in line, may stand in front of access device 210 to have his picture taken, which restarts the mobile device identification process again for a subsequent transaction.

II. Wireless Biometric Authentication with Public-Key Cryptography

Figure 4:
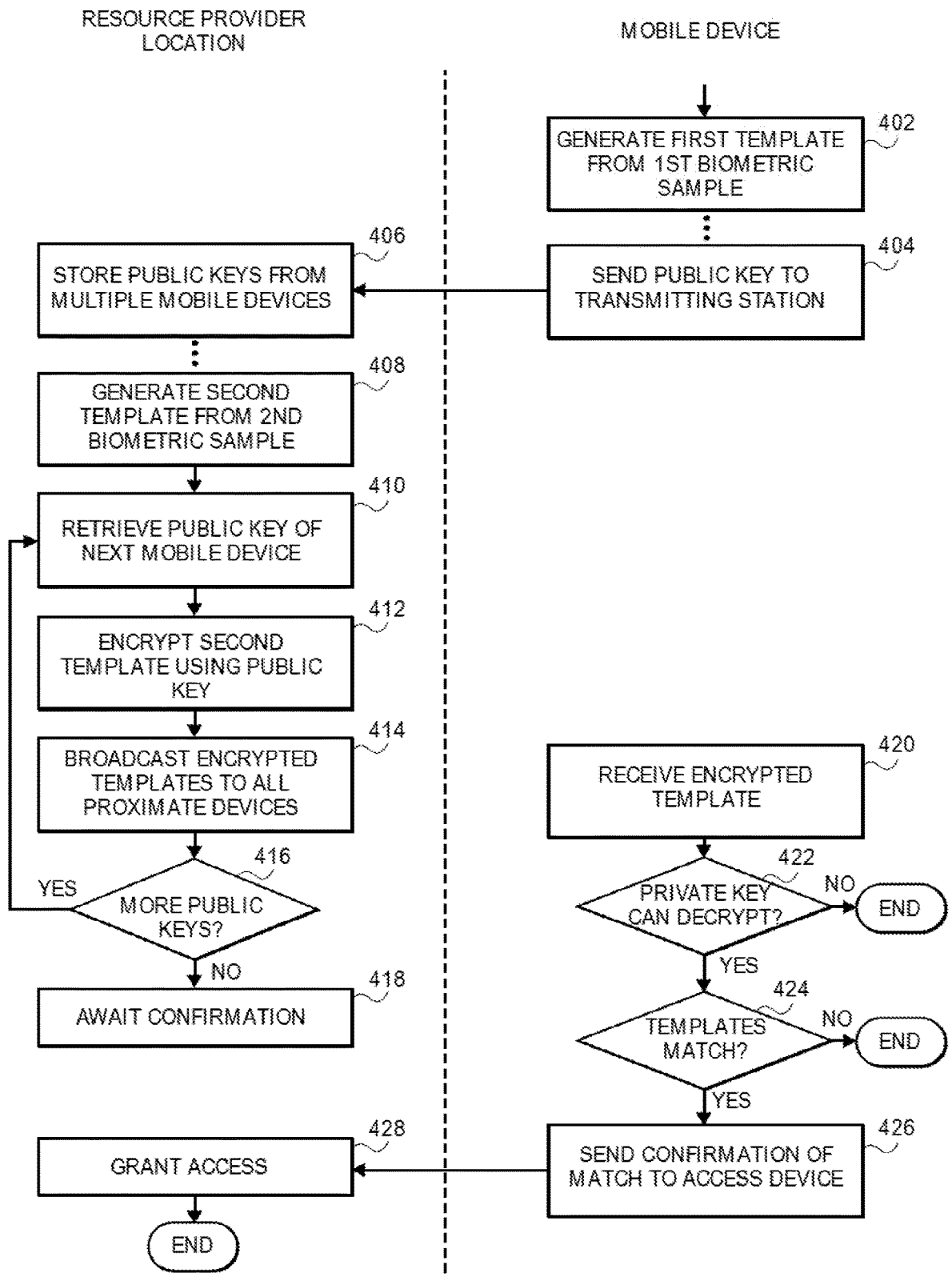
FIG. 4 shows a flowchart illustrating a wireless biometric authentication process that uses public-key encryption in accordance with some embodiments.

FIG. 4 shows a flowchart illustrating a wireless biometric authentication process that uses public-key encryption. The wireless biometric authentication process can be performed by an access device, a mobile device, a transmitting station and/or an external service, as described above in FIGS. 1-3.

At step 402, a first mobile device generates a first biometric template from a first biometric sample that is obtained from a first user, who is carrying the first mobile device. For example, the first mobile device may correspond to mobile device 104 in FIG. 1 and the first user may correspond to user 202 in FIG. 2. When an application is first installed onto mobile device 104, the application may have the mobile device take a facial photo of user 202. The application may then generate a biometric template from the photo and store the biometric template within mobile device 104.

At step 404, the first mobile device sends a first public key to a transmitting station of a resource provider location. For example, the transmitting station may correspond to transmitting station 102 in FIG. 1. As explained above in reference to FIG. 1, when user 202 carries mobile device 104 to a resource provider location, transmitting station 102 may send a beacon that comprises a transmitting station identifier to mobile device 104 upon detecting the mobile device. Upon receiving the beacon, the mobile device 104 may communicate with external service 106 to resolve the transmitting station identifier to a resource location identifier. Mobile device 104 may then transmit a message to transmitting station 102, where the message comprises the mobile device's public key certificate.

At step 406, the transmitting station receives and stores public keys, including the first public key, from multiple mobile devices, including the first mobile device. In particular, upon receiving the first public key sent in step 404, the transmitting station may create a first status entry that corresponds to the first mobile device and contains the first public key. Additionally, if the transmitting station receives public keys with other mobile devices at the resource provider location, the transmitting station may create additional status entries that each stores a public key of one of the other mobile devices. These status entries may be made available to an access device of the resource provider location.

At step 408, the access device generates a second biometric template from a second biometric sample that is obtained from the first user. For example, the access device may correspond to access device 210 in FIG. 2. As explained above in reference to FIGS. 2-3, when user 202 stands in front of access device 210 to perform a transaction with the access device, access device 210 may take a photo of the user's face. Access device 210 may then generate another biometric template of user 202 from the photo.

During steps 410-416, the second biometric template may be broadcasted multiple times to all nearby devices. To safeguard the transaction and the users' privacy, the access device may encrypt the second biometric template with a public key associated with one of the nearby mobile devices each time before the second biometric template is broadcasted. When the second biometric template is encrypted with a mobile device's public key, only that mobile device may use its private key to decrypt the broadcast and all other nearby mobile devices will fail to decrypt the same broadcast. To ensure that each nearby device gets an opportunity to decrypt the encrypted second biometric template, the access device may repeatedly encrypt and broadcast the second biometric template with a different public key each time until either (i) the access device receives a confirmation of a match from one of the nearby mobile devices or (ii) each nearby mobile device has had its public key used at least once. Accordingly, the number of times the second biometric template is broadcasted may be as high as the number of nearby mobile devices.

Prior to performing the broadcasts, the access device may identify which mobile devices are nearby. For example, access device 210 may use BLE (which may be adjusted in power) and/or mesh technology to determine that each of mobile devices 104, 220, 222, and 224 is close enough to the access device that it could be the mobile device carried by user 202. Upon determining that four mobile devices are nearby, access device 210 may broadcast the second biometric template up to four times. For the first, second, third, and fourth broadcasts, access device 210 may encrypt the second biometric template using the public key of mobile device 104, the public key of mobile device 220, the public key of mobile device 222, and the public key of mobile device 224 respectively. After the broadcasts are performed, the access device may wait for one of the nearby mobile devices to respond with a confirmation of a match between the second biometric template and the mobile device's stored biometric template.

At step 410, the access device retrieves the next mobile device's public key. In particular, the access device may obtain a mobile device's public key from the status entry that was previously created in response to the detection of the mobile device.

At step 412, the access device encrypts the second biometric template using the public key. In particular, the access device may generate a message that comprises the following:

$$\text{Encrypt}_{PK}\{\text{Template,Amount,CAID,CAN,n,m,sk(n, m)}\}.$$

As can be seen in the formula above, the message may include a combination of values that are encrypted using the public key retrieved in step 410. The values may include Template, which is the biometric template, Amount, which is the purchase amount involved in the transaction, the resource provider location identifier (i.e., CAID and CAN), n, which is the nonce that was received from the mobile device associated with the public key, in, which is another fresh random nonce generated by the resource provider that is unique to each device and transaction, and "sk(n, m)," which is a secret session key that a mobile device may use to encrypt a confirmation of a match that is sent back to the access device, where the secret session key is unique to each device and transaction.

At step 414, the access device broadcasts the encrypted second biometric template to all nearby mobile devices, including the first mobile device. For example, access device 210 may generate a message comprising the formula described above in 412 and broadcast the message to mobile devices 104, 220, 222, and 224.

At decision 416, the access device makes a determination as to whether there are more nearby mobile devices that haven't had their public keys used for encrypting the second biometric template. If so, the process returns to step 410, where the access device retrieves the public key of another mobile device in preparation for making a subsequent broadcast of the second biometric template. Otherwise, the process proceeds to step 418.

At step 418, the access device waits for one of the nearby mobile devices to send a confirmation of a match between the second biometric template and the biometric template stored in the mobile device.

It should be noted that after the nearby mobile devices (including the first mobile device) receive the broadcasted message, each of the mobile devices may each attempt to decrypt the message using their respective private keys. Whichever mobile device is successful in decrypting the message may determine whether the mobile device's stored biometric template matches the second biometric template. If a match is determined, the mobile device may conclude that its user is conducting a transaction with the access device. Thus, the mobile device may respond to the access device with a confirmation of the match.

At step 420, the first mobile device receives the encrypted second biometric template that is broadcasted by the access device. In particular, the first mobile device may receive a message comprising the formula described above in step 412.

At decision 422, the first mobile device makes a determination as to whether its private key can be used to decrypt the second biometric template. In particular the first mobile device may attempt to decrypt the contents of the message to obtain the second biometric template, the purchase, the resource provider location identifier, the nonce n, and the nonce m, and the secret session key. If the decryption attempt fails, the first mobile device ignores the message and waits from the next broadcast. If the decryption attempt succeeds, the process proceeds to decision 424.

At decision 424, the first mobile device makes a determination as to whether the first biometric template matches the second biometric template. In some embodiments, prior to making the determination, the first mobile device checks whether the nonce n matches the nonce it previously sent to the resource provider. If so, the first mobile device may also check whether the resource provider location identifier matches what is expected. If so, the first mobile device may then determine whether the first biometric template matches the second biometric template. If a match is found, the first mobile device may conclude that its owner is conducting a transaction with the access device. The first mobile device ignores the message if n is incorrect, the resource provider location identifier has an unexpected value, or the biometric templates do not match.

At step 426, the first mobile device sends a confirmation of the match to the access device. For example, after determining a match between its stored biometric template and the second biometric template, mobile device 104 may prepare a payment message that comprises the following:

$$\text{Encrypt}_{sk(n,m)}\{\text{Sign}_{P_v}(n,m,\text{CAID},\text{CAN},\text{PAN},\text{exp date},\text{Amount})\}$$

As can be seen in the formula above, the message may include a combination of values that are encrypted using the secret session key described in step 412. The values may include Amount, which is the purchase amount involved in the transaction, the resource provider location identifier (i.e., CAID and CAN), n and m, which are the nonces described in step 412, PAN (e.g., the last four digits of the PAN), which is the primary account that identifies a payment account of user 202, and exp date, which an expiration date associated with the payment account. Additionally, the combination may be signed with the mobile device's private key ($\text{Sign}_{P_v}$) prior to be being encrypted with the secret session key. Mobile device 104 may transmit the payment message to access device 210 in a contactless transaction.

At step 428, the access device conducts the transaction or otherwise grants the first user access to the requested resource. For example, access device 210, upon receiving the payment message sent by mobile device 104 in step 426, may validate the signature using the public key of mobile device 104. Access device 210 may also verify that the nonces n and m are consistent. Access device 210 may then display, to user 202, his customer identifier Cust_ID and prompt the user to accept the charges. Here, user 202 may press a button provided by access device 210, which causes the resource provider to submit an authorization request message to a payment processing network associated with a payment account of user 202. In some embodiments, when an authorization approval is received, the receipt may be wirelessly communicated to mobile device 104 (e.g., via SMS).

It should be noted that including the nonce m in the messages sent between the access device and the first mobile device in steps 414 and 426 may prevent man-in-the-middle (MITM) attacks as the access device will verify that the signature key used for the signature is consistent with the public key used to encrypt m in the message sent in step 414.

III. Wireless Biometric Authentication Using a Fuzzy Extractor

To address the issue of broadcasting a user's biometric templates to nearby mobile devices, certain embodiments of the invention may utilize the concept of fuzzy extractors. Using the system illustrated in FIG. 2, although access device 210 may encrypt the second biometric template with a public key each it broadcasts the template, each of mobile devices 104, 220, 222, and 224 are likely to decrypt second biometric template at least once. Accordingly, mobile devices 220, 222, and 224, each of which are not carried by user 202, may attempt to decrypt a biometric template generated from the face of user 202. Although it is encrypted, the other user would obtain a biometric sample of user 202 without the consent of user 202. It would be better if biometric samples, whether encrypted or not encrypted, are not transferred to the mobile devices of other users.

Thus, to limit the number of mobile devices that are able to decrypt the second biometric template, the access device may utilize encryption based on the concept of fuzzy extractors. The concept of fuzzy extractors will now be described. At a high level, a fuzzy extractor may correspond to a mechanism used to generate cryptographic keys from biometric templates in a way that if the mechanism generates a particular cryptographic key from a first biometric template, the mechanism will generate an identical cryptographic key from a second biometric template so long as the second biometric template matches (i.e., is not necessarily identical to, but close enough to) the first biometric template. The functional definition of a fuzzy extractor is as follows.

A fuzzy extractor comprises two functions: a first fuzzy extractor function G and a second fuzzy extractor function R. G takes a biometric template W_D and maps it to a pair of values (R_D, S_D), where R_D is a secret cryptographic key and S_D is a public value that is needed for recreating R_D from any biometric template W_D' that matches W_D. R takes W_D' and S_D and maps them to a secret cryptographic key R_D', where R_D' is equal to R_D if W_D' matches W. Stated another way, the fuzzy extractor function G is used to generate a secret cryptographic key and a public value from a first biometric template while the second fuzzy extractor function R can re-generate the same secret cryptographic key from the same public value and a second biometric template as long as the first and second biometric templates match. Further details on fuzzy extractors can be found in an article entitled "Fuzzy Extractors; How to Generate Strong Keys from Biometrics and Other Noisy Data," by Yegeniy Dodis, et al. SIAM Journal on Computing, 38(1):97-139, 2008. This reference is herein incorporated by reference in its entirety for all purposes.

Figure 5:
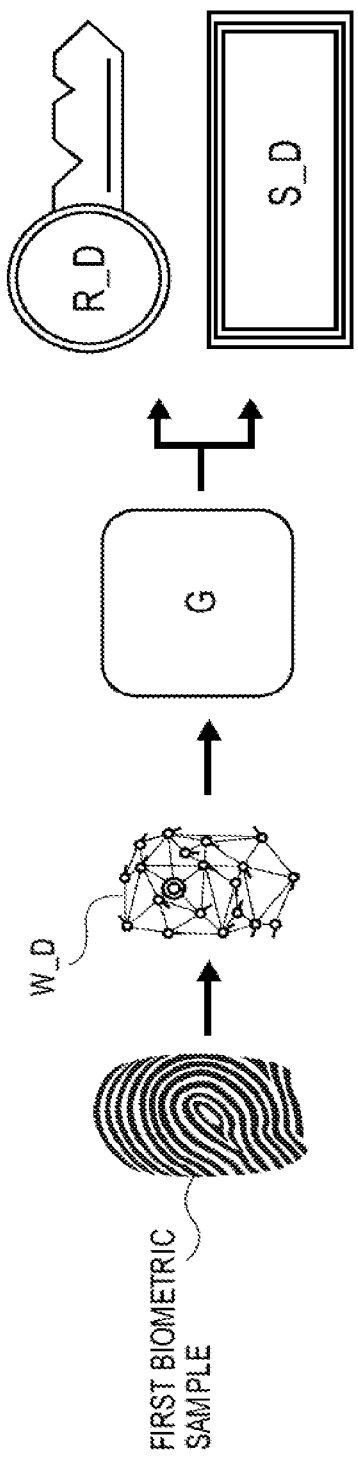
FIGS. 5-8 each shows a diagram illustrating the use of the concept of fuzzy extractors in accordance with some embodiments.

FIG. 5 shows a diagram illustrating how the first fuzzy extractor function G is used. As shown in FIG. 5, a mobile device may obtain a first biometric sample from its user. The mobile device may then generate a first biometric template W_D based on the first biometric sample. The mobile device then feeds W_D to G, which maps W_D to secret cryptographic key R_D and public value S_D. S_D may then be transmitted to an access device.

Figure 6:
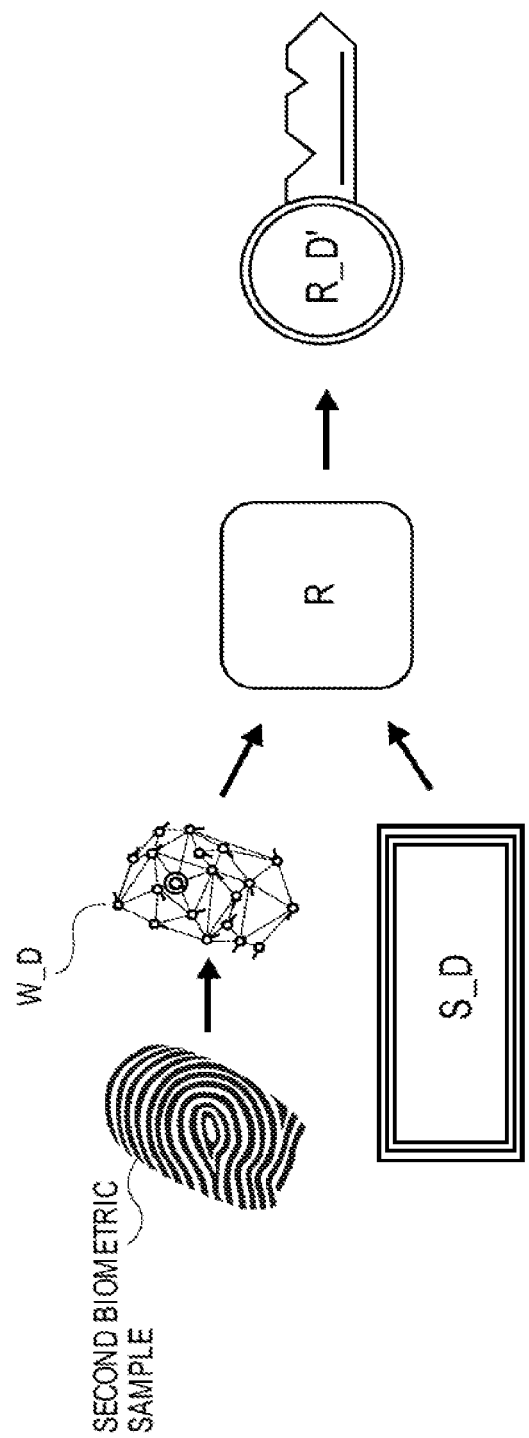

FIG. 6 shows a diagram illustrating how the second fuzzy extractor function R is used. As shown in FIG. 6, an access device may obtain S_D from the mobile device and a second biometric sample from the user of the mobile device. The access device may then generate a second biometric template W_D' based on the second biometric sample. The access device then feeds W_D' and S_D to R, which maps them to a secret cryptographic key R_D'. Here, if W_D' matches W_D, R_D' will be equal to R_D. Accordingly, the mobile device and the access device are able to generate the same secret cryptographic key independently from the same public value and matching biometric templates. Thus, the access device may use R_D' to encrypt messages that it broadcasts to the mobile device and other nearby mobile devices In addition to securing communications between the access device and the mobile device, R_D' may be used to determine whether W_D matches W_D'. Stated another way, because two devices are only able to generate the same secret cryptographic key when their biometric templates match, any mobile device can infer from a successful decryption of a broadcasted message that (i) the mobile device and the access device have generated the same cryptographic key and (ii) the mobile device's biometric template matches the access device's biometric template. This may provide the advantage of keeping a user's biometric template private from the mobile devices of other nearby users during the transaction.

This technique of encrypting biometric templates using the concept of fuzzy extractors may be developed further to address situations where the access device itself is not entirely trusted. For example, the user may encounter rogue terminals (e.g., fake terminals, stolen terminals, or hacked terminals). Furthermore, in some embodiments, a rogue access device could potentially recreate the biometric template stored by the user's mobile device from a matching biometric template that is generated by the terminal and the public value provided from the mobile device to the access device, which introduces a privacy issue. Accordingly, in situations where the biometric template that is generated on a user's mobile device is especially detailed (e.g., the biometric template is derived from an especially high quality photo of the user's face), the user may prefer not to trust access devices with his or her complete biometric template.

Figure 7:
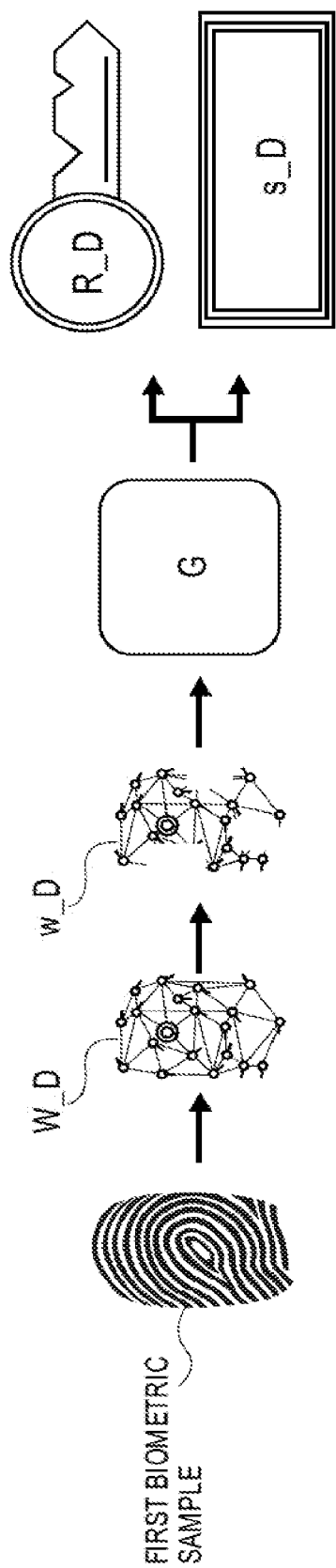

For the reasons above, some embodiments may utilize large biometric templates and small biometric templates. FIG. 7 shows a diagram illustrating how the first fuzzy extractor function G in embodiments that utilize both large and small biometric templates. As shown in FIG. 7, a mobile device may obtain a first biometric sample from its user. The mobile device may then generate a first large biometric template W_D based on the first biometric sample. The mobile device may then generated a first small biometric template w_D from W_D by obfuscating W_D or deleting portions of W_D. The mobile device then feeds w_D to G, which maps w_D to secret cryptographic key r_D and public value s_D. s_D may then be transmitted to an access device. If the access device turns out to be rogue, the access device could re-generate w_D using s_D and a biometric template w_D' that matches w_D. However, because w_D is of such low quality, the user of the mobile device may not mind that w_D has been compromised.

Figure 8:
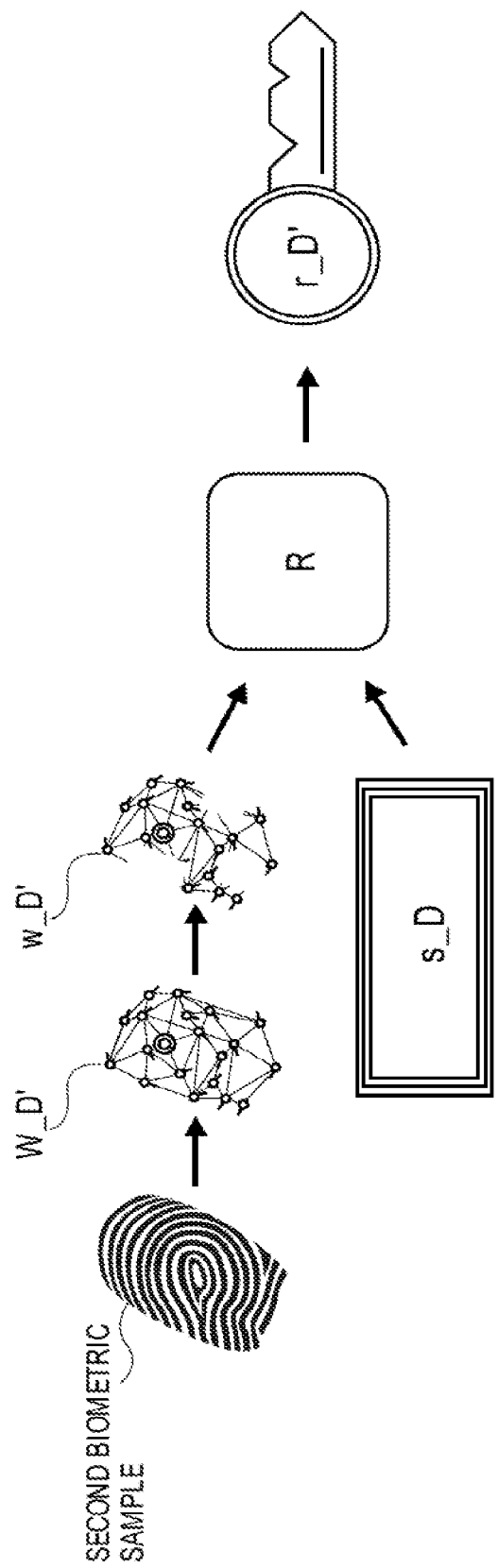

FIG. 8 shows a diagram illustrating how the second fuzzy extractor function R is used in embodiments that utilize both large and small biometrics templates. As shown in FIG. 8, an access device may obtain s_D from the mobile device and a second biometric sample from the user of the mobile device. The access device may then generate a second large biometric template W_D' based on the second biometric sample. The access device may then generate a second small biometric template w_D' in way similar to how w_D was generated from W_D. The access device then feeds w_D' and s_D to R, which maps them to a secret cryptographic key r_D'. Here, if W matches W_D', w_D' will match w_D. If w_D matches w_D', R_D' will be equal to R_D. Once again, the mobile device and the access device are able to generate the same secret cryptographic key independently from the same public value and matching biometric templates. Thus, the access device may use r_D' to encrypt messages that it broadcasts to the mobile device and other nearby mobile devices.

Figure 9:
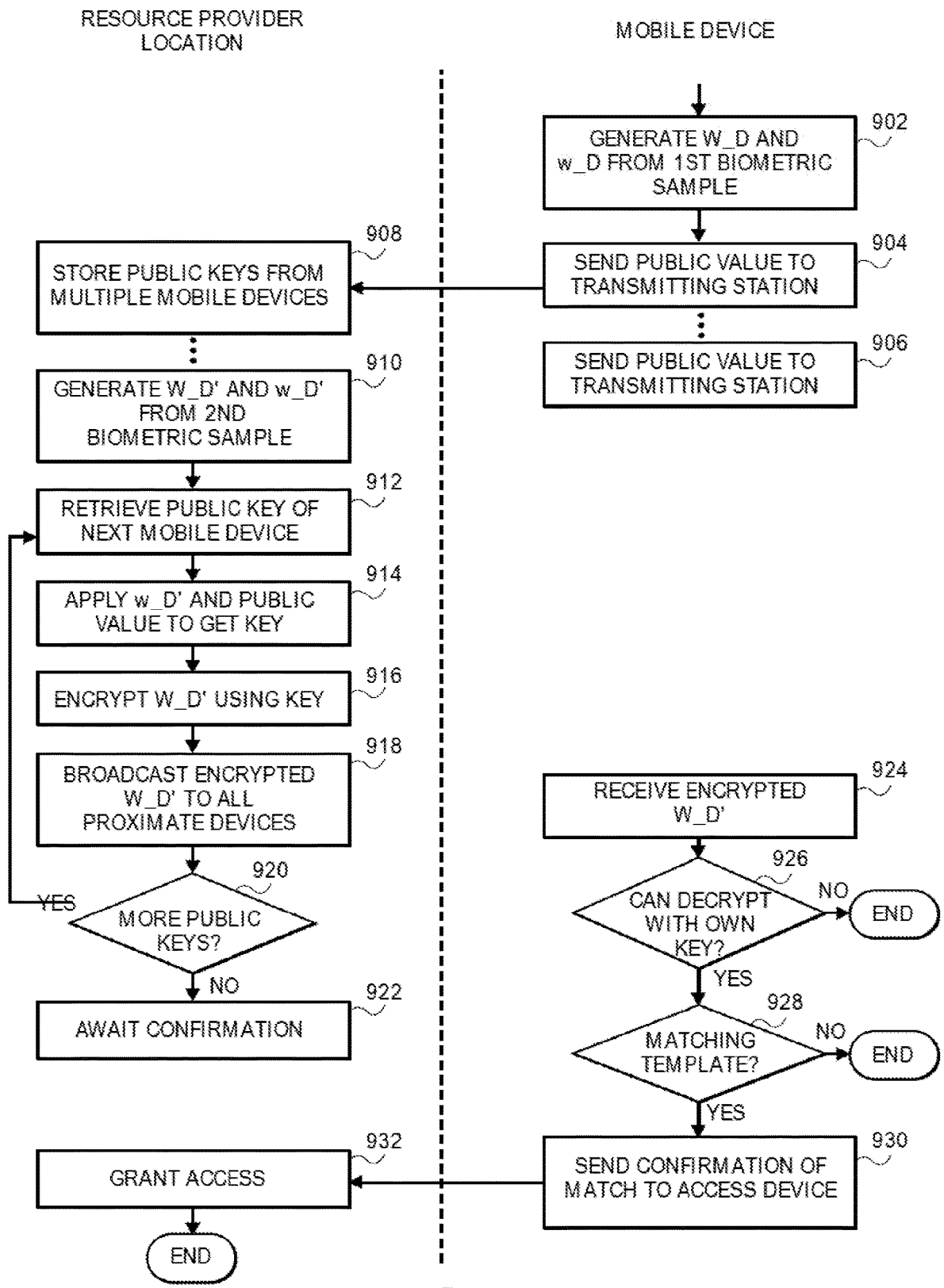
FIG. 9 shows a flowchart illustrating a wireless biometric authentication process that uses the concept of fuzzy extractors in accordance with some embodiments.

FIG. 9 shows a flowchart illustrating a wireless biometric authentication process that uses the concept of fuzzy extractors. The wireless biometric authentication process can be performed by an access device, a mobile device, a transmitting station and/or an external service, as described above in FIGS. 1-3.

At step 902, a first mobile device generates a first large biometric template W_D and a first small biometric template w_D from a first biometric sample that is obtained from a first user, who is carrying the first mobile device. For example, the first mobile device may correspond to mobile device 104 in FIG. 1 and the first user may correspond to user 202 in FIG. 2.

At step 904, the first mobile device feeds w_D to a first extractor function G to obtain a first secret cryptographic key and a first public value.

At step 906, the first mobile device sends its public value to a transmitting station of a resource provider location. For example, the transmitting station may correspond to transmitting station 102 in FIG. 1. As explained above in reference to FIG. 1, mobile device 104 may transmit a message to transmitting station 102, where the message comprises the public value that was generated by mobile device 104.

At step 908, the transmitting station receives and stores public values, including the first public value, from multiple mobile devices, including the first mobile device. In particular, upon receiving the first public value sent in step 906, the transmitting station may create a first status entry that corresponds to the first mobile device and contains the first public value. Additionally, if the transmitting station receives public values with other mobile devices at the resource provider location, the transmitting station may create additional status entries that each stores a public values of one of the other mobile devices. These status entries may be made available to an access device of the resource provider location.

At step 910, the access device generates a second large biometric template W_D' and a second small biometric template w_D' from a second biometric sample that is obtained from the first user. For example, the access device may correspond to access device 210 in FIG. 2.

At step 912, the access device retrieves the next mobile device's public value. In particular, the access device may obtain a mobile device's public value from the status entry that was previously created in response to the detection of the mobile device.

At step 914, the access device feeds w_D' and the public value to a second extractor function R to obtain a secret cryptographic key r_D' that corresponds to the next mobile device.

At step 916, the access device encrypts W_D' using r_D'. In particular, the access device may generate a message that comprises the following:

$$\text{Encrypt}_{r\_D'}\{W\_D'\}$$

As can be seen in the formula above, the message may include W_D' that is encrypted using r_D'. Although it is not reflected in the formula above, the message may include additional values that are also encrypted using r_D' (e.g., resource provider location identifier, nonce, etc.)

At step 918, the access device broadcasts the message to all nearby mobile devices. For example, access device 210 may generate a message comprising the formula described above in 916 and broadcast the message to mobile devices 104, 220, 222, and 224.

At decision 920, the access device makes a determination as to whether there are more nearby mobile devices that haven't had their public values used for generating a secret cryptographic key. If so, the process returns to step 912, where the access device retrieves the public value of another mobile device in preparation for making a subsequent broadcast of the second biometric template. Otherwise, the process proceeds to step 922.

At step 922, the access device waits for one of the nearby mobile devices to send a confirmation of a match between the second biometric template and the biometric template stored in the mobile device.

It should be noted that after the nearby mobile devices (including the first mobile device) receive the broadcasted message, each of the mobile devices attempt to decrypt the message with their respective secret cryptographic keys. Whichever mobile device is successful in decrypting the message may assume that its small biometric template (e.g., w_D in the case of the first mobile device) matches w_D' and from this, infer a high likelihood that its large biometric template (e.g., W_D in the case of the first mobile device) matches W_D'. Accordingly, the mobile device may proceed to determine whether its large biometric template matches W_D'. If a match is determined, the mobile device may conclude that its user is conducting a transaction with the access device. Thus, the mobile device may respond to the access device with a confirmation of the match.

At step 924, the first mobile device receives the encrypted W_D'. In particular, the first mobile device may receive a message comprising the formula as described above in step 916.

At decision 926, the first mobile device makes a determination as to whether the first cryptographic key can be used to decrypt the encrypted W_D'. If the decryption attempt fails (e.g., the decryption attempt merely produces garbage), the first mobile device ignores the message and waits from the next broadcast. If the decryption attempt succeeds, the first mobile device takes this as evidence that the first user is likely conducting a transaction with the access device. Accordingly, the process proceeds to decision 928.

At decision 928, the first mobile device makes a determination as to whether W_D matches W_D'. If a match is found, the first mobile device may conclude that its owner is conducting a transaction with the access device. The first mobile device ignores the message if W_D does not match W_D'.

At step 930, the first mobile device sends a confirmation of the match to the access device. The confirmation may include various additional information including the first user's PAN (e.g., the last four numbers of the PAN), the first user's customer identifier and/or authentication information (e.g., card art).

At step 932, the access device conducts the transaction or otherwise grants the first user access to the requested resource. For example, access device 210, upon receiving the confirmation sent by mobile device 104 in step 930, may display to user 202 information provided by the confirmation (e.g., PAN, customer identifier, card art), which enables the user to confirm that the correct mobile device was selected. Access device 210 may also prompt the user to accept the charges.

It should be noted that while it is generally expected that only one of the nearby mobile devices responds with a confirmation of a match for any particular transaction, it is possible that an edge case might arise, where none of the nearby mobile devices determine a match or multiple mobile devices determine a match. Various measures that may be used individually or in combination to address such edge cases are now described.

In one measure, when the access device receives confirmations from N (where N=1, 2, 3 . . . ) nearby mobile devices, all of which have determined a match, then N false entries are created. The access device then presents to the user a set of buttons that includes one button for each matching device and one button for each of the false entries. Each button that is associated with a matching device may be endowed with card art, a customer identifier, phone number, expiration date, and/or a portion of the PAN of the matching device's user while each button that is associated with a false entry displays false information. The user is then prompted to press the button that is associated with the information associated with user.

In another measure, an access device may keep the photo of the user that performed the transaction for dispute resolution purposes.

In another measure, rather than have the access device keep the photo of the user, have the mobile device of the user keep the photo. Here, the photo may be encrypted in a way that only the resource provider or an entity on the payment processing network can decrypt the photo.

In another measure, the mobile device may communicate a code to the access device. The access device may then prompt the user performing the transaction to enter the code. The transaction is conducted only if the user enters the correct code. In some embodiments, the code could be a piece of information known by the user (e.g., 2-4 digits of the user's phone number).

In another measure, the access device prompts the user to enter a squiggle, signature, or other pattern at the access device's touch screen, which is then communicated from the access device to the user's mobile device. The transaction is conducted only if the pattern entered by the user matches a pattern stored on the mobile device.

In some embodiments, if wireless biometric authentication fails in some way, the access device may revert back to conducting the transaction via traditional means (e.g., credit card, cash, etc.).

In the embodiments described above, once a match between a mobile device's stored biometric template and another biometric template obtained by a resource provider, any suitable transaction may be conducted. For example, (i) a contactless, NEC transaction may be conducted between the mobile device and the resource provider's access device, (ii), a remote transaction can be conducted, or (iii) a contact type transaction may be performed. In some embodiments, the access device may generate an authorization request message which may be sent to an issuer computer via an acquirer computer and a payment processing network. The issuer computer may then return an authorization response back through the reverse path approving or denying the transaction. If the transaction is approved, then a clearing and settlement process between the acquirer computer, the payment processing network, and the issuer computer may take place.

Although the examples above specifically discuss payment transactions, embodiments of the invention are not limited to payment transactions. For example, the wireless biometric authentication techniques described above can be used to access a resource provided by any suitable resource providing entity. Other examples of resources that can be accessed using the authentication processes according to embodiments of the invention include access to a venue, access to information, etc.

IV. Portable Communication Device

Figure 10:
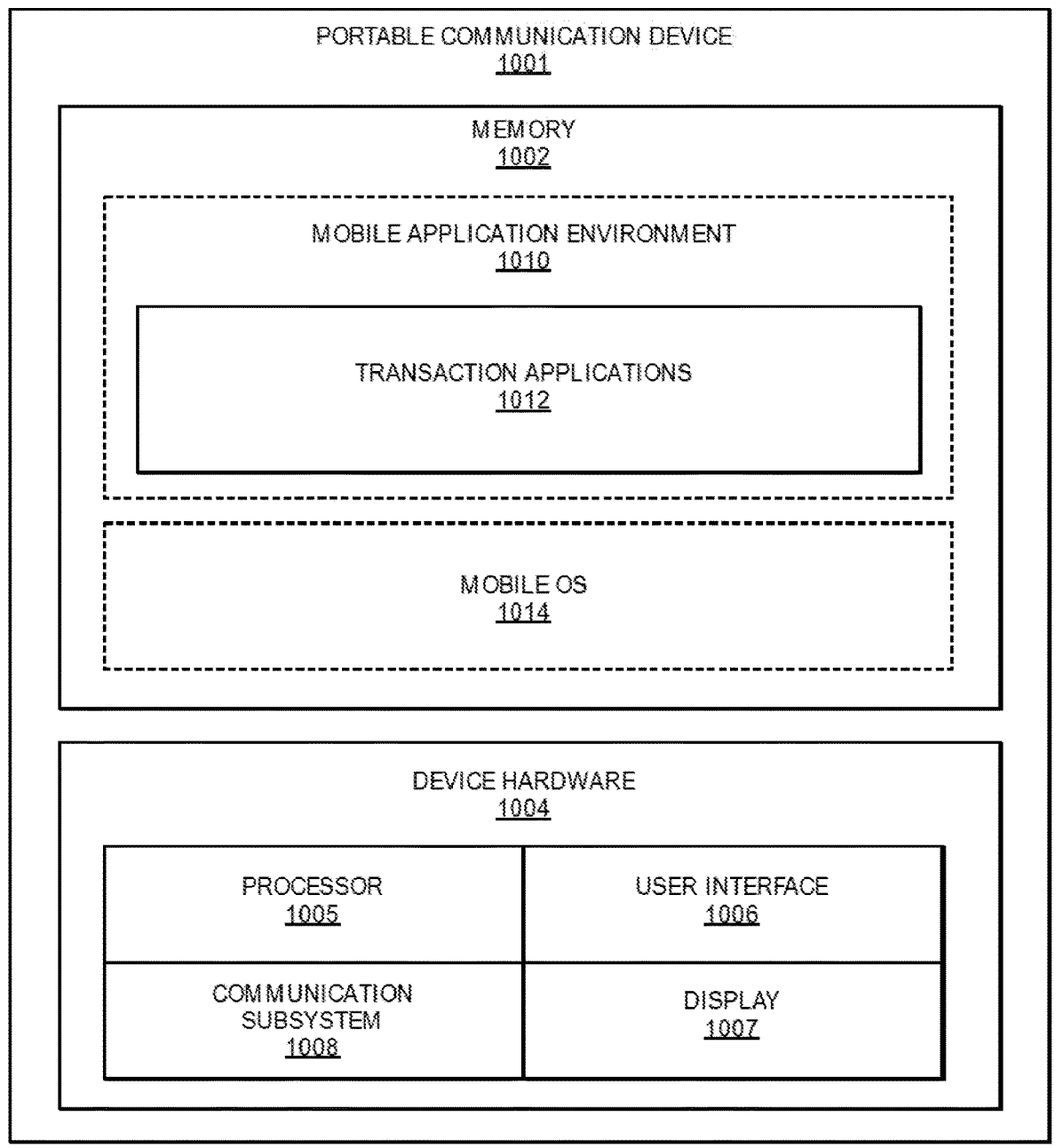
FIG. 10 shows a block diagram of a portable communication device in accordance with some embodiments.

FIG. 10 illustrates a block diagram of a portable communication device 1001, according to some embodiments. The device 1001 may be an example of the previously described mobile devices (e.g., 104). Portable communication device 1001 may include device hardware 1004 coupled to a memory 1002. Device hardware 1004 may include a processor 1005, a communications subsystem 1008, user interface 1006, and a display 1007 (which may be part of user interface 1006). Processor 1005 can be implemented as one or more integrated circuits (e.g., one or more single core or multicore microprocessors and/or microcontrollers), and is used to control the operation of portable communication device 1001. Processor 1005 can execute a variety of programs in response to program code or computer-readable code stored in memory 1002, and can maintain multiple concurrently executing programs or processes. Communications subsystem 1009 may include one or more RF transceivers and/or connectors that can be used by portable communication device 1001 to communicate with other devices and/or to connect with external networks. User interface 1006 can include any combination of input and output elements to allow a user to interact with and invoke the functionalities of portable communication device 1001. In some embodiments, display 1007 may be part of user interface 1006.

Memory 1002 can be implemented using any combination of any number of non-volatile memories (e.g., flash memory) and volatile memories (e.g., DRAM, SRAM), or any other non-transitory storage medium, or a combination thereof media. Memory 1002 may store a mobile OS 1014 and a mobile application environment 1010 where one or more mobile applications reside 1012 (e.g., a payment application such as a mobile wallet application, merchant application, mobile location application, etc.) to be executed by processor 1005. Also, the memory 1002 may store computer code, executable by the processor 1005, for performing any of the functions described herein.

Some entities or components described herein may be associated with or operate one or more computer apparatuses to facilitate the functions described herein. Some of the entities or components described herein, including any server or database, may use any suitable number of subsystems to facilitate the functions.

Examples of such subsystems or components can be interconnected via a system bus. Additional subsystems such as a printer, keyboard, fixed disk (or other memory comprising computer readable media), monitor, which is coupled to display adapter, and others are shown. Peripherals and input/output (I/O) devices, which couple to I/O controller (which can be a processor or other suitable controller), can be connected to the computer system by any number of means known in the art, such as serial port. For example, serial port or external interface can be used to connect the computer apparatus to a wide area network such as the Internet, a mouse input device, or a scanner. The interconnection via system bus allows the central processor to communicate with each subsystem and to control the execution of instructions from system memory or the fixed disk, as well as the exchange of information between subsystems. The system memory and/or the fixed disk may embody a computer readable medium.

Embodiments of the invention provide for a number of advantages. For example, embodiments of the invention may allow users to perform hands-free transactions so long as the user possesses a mobile device that can wirelessly communicate with the resource provider. In particular, the use of biometric samples to automatically associate a user's image with his or her mobile device frees the user from having to manually provide the association between the user and the user's mobile device to the resource provider. Additionally, embodiments of the invention may enable a user to participate in biometrics-based hands-free transactions while reducing risks to the user's biometric samples being compromised. In particular, the use of fuzzy extractor-based encryption may secure a user's biometric samples from being revealed to other nearby mobile devices while the use of large and small templates may reduce the risks of a rogue access device stealing the user's biometric samples. Furthermore, embodiments of the invention may provide a wireless biometric authentication system that is fully automated and does not need any human input from a human operator during a user's authentication process Messages between the computers, networks, and devices described herein may be transmitted using a secure communications protocols such as, but not limited to, File Transfer Protocol (FTP); HyperText Transfer Protocol (HTTP); Secure Hypertext Transfer Protocol (HTTPS), Secure Socket Layer (SSL), ISO (e.g., ISO 8583) and/or the like.

Other embodiments of the invention are also contemplated. Other embodiments of the invention may include the following: obtaining, by a mobile device, a second biometric sample of a user; generating a second small biometric template and a second large biometric template from the biometric sample; generating a first secret cryptographic key and a public value by passing the second large biometric template to a first function of a fuzzy extractor; transmitting the public value to an access device; receiving, from the access device, an encrypted first large biometric template that is encrypted with a secret cryptographic key that is generated by passing the public value and a first small biometric template to a second function of the fuzzy extractor, wherein the first small biometric template is generated from a first biometric sample on the access device; attempting to decrypt the encrypted first large biometric template with the first secret cryptographic key; responsive to decrypting the encrypted first large biometric template, determining whether the first large biometric template matches the second large biometric template; and responsive to determining that the first large biometric template matches the second large biometric template, sending a confirmation of the match to the access device.

Another embodiment of the invention can be directed to an access device that includes code, executable by a processor, to perform the above described method.

Other embodiments of the invention may include the following: obtaining, by an access device, a first biometric sample of a user; generating a first small biometric template and a first large biometric template from the first biometric sample; for each mobile device of a plurality of mobile devices within a proximate vicinity of the access device, the plurality of mobile devices comprising a first mobile device: retrieving a public value of the mobile device, wherein: the public value of the mobile device was generated by passing a small biometric template of the mobile device to a first function of a fuzzy extractor; and the small biometric template of the mobile device was generated from a biometric sample of the mobile device; generating a secret cryptographic key by passing the first small biometric template and the public value of the mobile device to a second function of the fuzzy extractor; encrypting the first large biometric template with the secret cryptographic key; and broadcasting the encrypted first large biometric template to the plurality of mobile devices;

Another embodiment of the invention can be directed to an access device that includes code, executable by a processor, to perform the above described method.
receiving, from the first mobile device, a confirmation of a match between the first large biometric template and a biometric template of the first mobile device, wherein the biometric template of the first mobile device was generated from a biometric sample of the first mobile device; and responsive to the confirmation, conducting a transaction between the access device and the first mobile device Specific details regarding some of the above-described aspects are provided above. The specific details of the specific aspects may be combined in any suitable manner without departing from the spirit and scope of embodiments of the invention. For example, although the embodiments described above relate to authentication processing, other types of processing can be performed using embodiments of the invention. For example, since embodiments of the invention can verify that a user is actually at a specific location, embodiments of the invention could also be used to provide incentives or rewards to a user.

It should be understood that the present invention as described above can be implemented in the form of control logic using computer software (stored in a tangible physical medium) in a modular or integrated manner. Based on the disclosure and teachings provided herein, a person of ordinary skill in the art will know and appreciate other ways and/or methods to implement the present invention using hardware and a combination of hardware and software.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method comprising:
    obtaining, by a mobile device, a second biometric sample of a user;
    generating, by the mobile device, a second biometric template from the second biometric sample;
    generating, by the mobile device, a first secret cryptographic key and a public value by passing the second biometric template to a first function of a fuzzy extractor;
    transmitting, by the mobile device, the public value to an access device;
    receiving, by the mobile device and from the access device, an encrypted first biometric template that is encrypted with a secret cryptographic key that is generated by passing the public value and a first biometric template to a second function of the fuzzy extractor, the access device generating the first biometric template from a first biometric sample on the access device;
    attempting, by the mobile device, to decrypt the encrypted first biometric template with the first secret cryptographic key;
    responsive to decrypting the encrypted first biometric template, determining, by the mobile device, whether the first biometric template matches the second biometric template; and
    responsive to determining that the first biometric template matches the second biometric template, sending, by the mobile device, a confirmation of a match to the access device.

2. The method of claim 1,
    wherein generating the first biometric template from the first biometric sample comprises generating a first small biometric template and a first large biometric template;
    wherein generating the second biometric template from the second biometric sample comprises generating a second small biometric template and a second large biometric template;
    wherein generating the public value comprises passing the second small biometric template to the first function of the fuzzy extractor;
    wherein the secret cryptographic key is generated by passing the first small biometric template and the public value of the mobile device to the second function of the fuzzy extractor;
    wherein the access device encrypts the first biometric template with the secret cryptographic key by encrypting the first large biometric template with the secret cryptographic key; and
    wherein the match is between the first large biometric template and the second large biometric template.

3. The method of claim 2, wherein the first small biometric template is one of:
    an obfuscated copy of the first large biometric template; and
    an incomplete copy of the first large biometric template.

4. The method of claim 2, wherein the first large biometric template and the first small biometric template are generated from the first biometric sample by:
    extracting one or more distinct characteristics from the first biometric sample; and
    generating digital reference of the one or more distinct characteristics.

5. The method of claim 1, wherein the access device is a point of sale terminal.

6. The method of claim 1, wherein the mobile device is a mobile phone.

7. The method of claim 2, wherein a similarity between the first small biometric template and the second small biometric template of the mobile device exceeds a threshold matching score.

8. The method of claim 2, further comprising:
    receiving a transmitting station identifier at the mobile device from a transmitting station.

9. The method of claim 2 wherein obtaining the second biometric sample of the user comprises one of:
    taking a photographic image of the user's face;
    taking a fingerprint of the user;
    taking a voice sample of the user;
    taking a DNA sample of the user;
    taking a retinal scan of the user; and
    taking a hair sample of the user.

10. The method of claim 1, wherein the first biometric template is encrypted along with a resource provider identifier and a nonce.

11. The method of claim 1, wherein the public value is a public key.

12. The method of claim 1, wherein the confirmation comprises a payment message that comprises an amount, a resource provider identifier and a primary account number.

13. The method of claim 12, wherein the payment message is signed by the first secret cryptographic key.

14. The method of claim 2, wherein the access device broadcasts the encrypted first biometric template to a plurality of mobile devices in a vicinity of the access device.

15. A mobile device comprising:
a processor; and
a computer readable medium coupled to the processor, the computer readable medium comprising code executable by the processor for implementing a method comprising:
obtaining a second biometric sample of a user;
generating a second biometric template from the second biometric sample;
generating a first secret cryptographic key and a public value by passing the second biometric template to a first function of a fuzzy extractor;
transmitting the public value to an access device;
receiving, from the access device, an encrypted first biometric template that is encrypted with a secret cryptographic key that is generated by passing the public value and a first biometric template to a second function of the fuzzy extractor, the access device generating the first biometric template from a first biometric sample on the access device;
attempting to decrypt the encrypted first biometric template with the first secret cryptographic key;
responsive to decrypting the encrypted first biometric template, determining whether the first biometric template matches the second biometric template; and
responsive to determining that the first biometric template matches the second biometric template, sending a confirmation of a match to the access device.

16. The mobile device of claim 15,
wherein generating the first biometric template from the first biometric sample comprises generating a first small biometric template and a first large biometric template;
wherein generating the second biometric template from the second biometric sample comprises generating a second small biometric template and a second large biometric template;
wherein generating the public value comprises passing the second small biometric template to the first function of the fuzzy extractor;
wherein the secret cryptographic key is generated by passing the first small biometric template and the public value of the mobile device to the second function of the fuzzy extractor;
wherein the access device encrypts the first biometric template with the secret cryptographic key by encrypting the first large biometric template with the secret cryptographic key; and
wherein the match is between the first large biometric template and the second large biometric template.

17. The mobile device of claim 16, wherein the first small biometric template is one of:
an obfuscated copy of the first large biometric template; and
an incomplete copy of the first large biometric template.

18. The mobile device of claim 16, wherein the first large biometric template and the first small biometric template are generated from the first biometric sample by:
extracting one or more distinct characteristics from the first biometric sample; and
generating digital reference of the one or more distinct characteristics.

19. The mobile device of claim 16, wherein the mobile device is a mobile phone.

20. The mobile device of claim 15, wherein obtaining the second biometric sample of the user comprises one of:
taking a photographic image of the user's face;
taking a fingerprint of the user;
taking a voice sample of the user;
taking a DNA sample of the user;
taking a retinal scan of the user; and
taking a hair sample of the user.

* * * * *